United States Patent
Campagna (10) Patent No.: US 8,711,369 B2
(45) Date of Patent: Apr. 29, 2014

(54) LASER RECEIVER FOR DETECTING A RELATIVE POSITION

(75) Inventor: Clayton Eugene Campagna, St. Gallen (CH)

(73) Assignee: Leica Geosystems AG, Heerbrugg (CH)

( * ) Notice: Subject to any disclaimer, the term of this patent is extended or adjusted under 35 U.S.C. 154(b) by 251 days.

(21) Appl. No.: 13/130,347

(22) PCT Filed: Nov. 26, 2009

(86) PCT No.: PCT/EP2009/065913
§ 371 (c)(1),
(2), (4) Date: May 20, 2011

(87) PCT Pub. No.: WO2010/069734
PCT Pub. Date: Jun. 24, 2010

(65) Prior Publication Data
US 2011/0235053 A1    Sep. 29, 2011

(30) Foreign Application Priority Data
Dec. 17, 2008   (EP) ................................. 08171970

(51) Int. Cl.
| | | |
|---|---|---|
| G01B 11/14 | (2006.01) | |
| G01C 1/00 | (2006.01) | |
| G01C 5/00 | (2006.01) | |
| G01C 15/08 | (2006.01) | |

(52) U.S. Cl.
USPC ............. 356/614; 356/620; 356/622; 33/283; 33/284; 33/291; 33/295

(58) Field of Classification Search
USPC .......... 356/614, 615, 620, 622, 623, 399, 400
See application file for complete search history.

(56) References Cited

U.S. PATENT DOCUMENTS

| | | | |
|---|---|---|---|
| 5,100,229 A * | 3/1992 | Lundberg et al. | 356/3.12 |
| 6,487,864 B1 * | 12/2002 | Platt et al. | 62/3.2 |
| 6,545,751 B2 * | 4/2003 | Beliveau et al. | 356/141.4 |
| 7,409,312 B2 * | 8/2008 | Conner et al. | 702/159 |
| 8,269,984 B2 * | 9/2012 | Hinderling et al. | 356/614 |
| 2003/0058446 A1 | 3/2003 | Douglas | |
| 2005/0057745 A1 * | 3/2005 | Bontje | 356/139.03 |
| 2006/0176482 A1 * | 8/2006 | Hamar | 356/400 |
| 2007/0000139 A1 * | 1/2007 | Chen | 33/286 |
| 2011/0235053 A1 * | 9/2011 | Campagna | 356/614 |

OTHER PUBLICATIONS

International Preliminary Report on Patentability issued Jun. 21, 2011 as received in PCT Application No. PCT/EP2009/065913.

* cited by examiner

Primary Examiner — Kara E. Geisel
Assistant Examiner — Maurice Smith
(74) Attorney, Agent, or Firm — Maschoff Brennan (57) ABSTRACT

The invention relates to a laser receiver for detecting a relative position of a defined zero point of said laser receiver with respect to a reference laser beam. Therefore, the laser receiver comprises a laser light photo sensor having a plurality of photo sensitive elements providing an electrical output when illuminated by said reference laser beam, a circuitry connected to said photo sensor for determination of said relative position and a visible readout for indication of said relative position, in particular for indicating if said zero point is on-grade with respect to said reference laser beam. According to the invention, at least a first laser fan emitter, with a laser light source and at least one fan-generating optical element, is provided for projecting a visible laser line onto a target surface, particularly in order to re-project a sharp marking-line through the vertical center of the reference laser beam.

25 Claims, 7 Drawing Sheets

LASER RECEIVER FOR DETECTING A RELATIVE POSITION

FIELD OF THE INVENTION

The present invention relates generally to a laser receiver for detecting a relative position with respect to a reference laser beam—in particular a reference laser beam of a rotating construction laser and a method for visibly marking locations with respect to a reference laser beam.

BACKGROUND

Alignment and marking of surfaces is a perennial problem in a variety of fields, ranging from construction to interior decorating. Alignment and marking of height references are necessary for walls that should be perpendicular to a floor, or otherwise plumb. Masonry and brick-laying practitioners are well aware of the importance of plumbed and aligned surfaces and chalk lines. Especially for internal finishing works, e.g. the installation of power outlets or furniture, it is often required to place several marks onto a wall, the marks each having equal heights and, thus, being on-grade with respect to each other. Furthermore, a home interior decorated with pictures and other wall ornamentation makes a much better appearance when the ornamentation is horizontally aligned and on-grade with respect to each other.

Many mechanical and electrical alignment and height measurement devices as well as numerous laser devices are available. Some of these products are cumbersome and others are not suitable for certain uses. Chalk lines, for instance, are disadvantageous for use in finished interior areas and for precisely referencing a desired predefined height.

Typical laser devices used for marking a true horizontal line and/or for precisely indicating a reference height are rotating construction lasers. The design of rotating lasers—and also of auto-leveling rotating construction lasers—is well known to persons skilled in the art. U.S. Pat. No. 4,062,634, issued Dec. 13, 1977, to Rando, illustrates a laser transmitter which provides such a rotating reference beam. The rotating beam defines a plane, and various measurements can be made using the plane as a reference. The reference plane may be horizontal or inclined. In particular, such devices allow construction workers to quickly lay out visible marking-lines or adjust heights by eye.

However, a conventional rotating laser generator is not well-equipped for projecting a flat or planar beam of light. Due to eye safety regulations, visible rotating construction lasers must have low power beams.

Hence, rotating construction lasers are—on the one hand—able to indicate a precise reference height. However—on the other hand—the width, brightness and straightness of the projected laser light are insufficient for many applications. The projected, visible laser line may be limited in its brightness over a distance, and also tends to defocus and become dimmer as a user works away from the source of the laser.

When rotating, the maximum realistic visual operating range of the laser—dependent on light conditions—is 10-20 meters from the rotating laser unit. Past this distance, the laser plane is both too wide to precisely locate its center due to the divergence of the rotating laser beam and not adequately bright to see with the naked eye. The user must either use a hand-held laser receiver to find the laser beam, and no longer work visually, or tear down the laser setup and move it closer to the desired work location. Both of these options are cumbersome and time consuming.

Another aspect that could be improved is the inability of laser devices to work around obstructions. That is, if a piece of furniture interrupts the laser beam, it may be blocked from further projection. Therefore, it is necessary to mark locations or heights, one by one, rather than working with the actual objects, in order to align them. Obstructions may include furniture, the operator of the device, moldings placed in a doorway, an interior wall or other obstacles.

As indicated above, one possibility in order to precisely transfer a reference height indicated by a laser plane of a rotating device is to use a hand-held laser receiver. Laser receivers allow for finding and sighting the rotating beam and marking corresponding locations on the wall adjacent to the laser receiver. Therefore, the operator moves the laser receiver in vertical direction to a position where it intercepts the laser beam, as indicated by a display on the receiver. One such laser receiver is shown in U.S. Pat. No. 4,240,208, issued Jun. 30, 1987, to Pehrson.

Conventional laser receivers are small hand-held devices which include a display and a laser light photo sensor. The photo sensor typically comprises a plurality of photo sensitive elements providing an electrical output when illuminated by the laser beam of a rotating laser. Particularly, the photo sensitive elements are arranged in a generally vertically oriented row.

Most laser detectors or receiver devices have included circuitry that provides an indication of the position of the detected reference light with respect to the device as a ratio between several output signals.

Especially, the circuitry is connected to the photo sensor and designed for determination—based upon the outputs of the photo sensitive elements—of a vertical offset between the receiver and the detected vertical center of the rotating beam. The receiver is moved by the operator until it indicates that it is on-grade with respect to the rotating laser beam. Particularly, the laser receiver has a defined zero-point, e.g. the center of the photo sensor—which has to be brought on-grade—that means on equal height—with respect to the vertical center of the detected rotating beam.

In order to allow an operator to transfer with high precision the detected height reference of the rotating beam onto a target surface like a wall, the laser receiver may comprise a height mark on the left or right side of the receiver housing.

However, when using such laser receivers, it is necessary to mark locations or heights, one by one, and, therefore, to have the receiver resting in hand during the pointwise transformation of the reference height onto the wall. Moreover, the wall itself requires marking with this method.

SUMMARY

It is an object of the present invention to provide an improved laser receiver for detecting and marking a relative position with respect to a reference laser beam, in particular a reference beam of a rotating construction laser.

Another object of the present invention is to provide an improved method for transferring a reference location or reference height indicated by a reference beam—especially of a rotating laser—onto a target surface like a wall.

Further objects of the invention are to provide a laser receiver respectively a method which allow the reference plane generated by a rotating construction laser to be used visually at longer distances, more precisely and/or also behind obstructions, i.e. without requiring a new setup of the rotating laser, an infrared rotating construction laser to be used visually, precisely transferring a reference height indicated by a rotating laser onto a target surface without requiring pointwise marking of several points of interest and particularly without requiring contacting or scribing the target surface.

Those objects are achieved by realizing the features of the independent claims. Features which further develop the invention in an alternative or advantageous manner are described in the dependent patent claims.

A laser receiver for detecting a reference laser beam according to the invention separates from conventional solutions in that the laser receiver is not only used to find and indicate the height of a reference beam i.e. of a rotating construction laser. Contrarily thereto, the inventive laser receiver is built for actively projecting a sharp and bright laser line onto a target surface, the laser line having a defined positional relationship relative to the reference beam. Therefore, a flat, planar laser fan is emitted in order to project the sharp visible laser line in particular on-grade with respect to the detected reference laser beam—which means on the same height as the reference beam.

The inventive concept makes use of the advantageous aspects of a rotating laser and eliminates the disadvantageous aspects thereof. Because rotating lasers are not well-equipped for projecting a flat and planar beam of light which can be easily and precisely recognized by eye, the inventive concept is to detect the reference beam and to project—with a defined positional relationship relative to the detected reference beam—an easily and precisely recognizable laser line onto a target surface. Therefore, an incidence position of the detected reference laser beam is determined and a flat laser fan is emitted in order to easily transfer and exactly mark a position or height indicated by the reference laser beam.

Particularly, the laser fan is emitted from an emitting-position being on-grade with respect the determined incidence position or incidence height of the reference beam and in a defined propagation direction. For example, the laser fan is emitted so as to generate a horizontal plane in order to project a leveled line onto a target surface. Hence, the projected line is precisely on-grade with respect to the determined incidence position of the reference beam and, thus, on equal height. In case the reference beam is emitted by a rotating construction laser generating a horizontal reference plane, the—in particular stationary—emitted laser fan projects a sharp and easily visible line onto the surface exactly in height of the vertical center of the rotating divergent reference beam. Therefore, the not visibly usable reference plane generated by the rotating laser can be made visibly usable, wherein the projected line by the fan precisely indicates and marks the height reference of the rotating laser.

Hence, the inventive concept allows the visual use of a rotation laser well past the normal visual operating range. This means fewer setups in practical use and faster construction. The invention further allows a user to detect the center of a wide, dim and/or invisible rotating plane and project a thin, bright and—where desired—leveled laser line through the vertical center of the reference plane onto a working surface. This allows the user to have all the benefits of a clear visual laser line, while saving time and preserving the accuracy of a single setup rotator system.

A pointwise transformation of the reference height indicated by the reference beam—particularly by contacting the surface with the receiver and scribing the surface adjacent the receiver—is not necessary. Contrarily thereto, according to the invention, the visible laser line generated by the laser fan emitter indicates and marks the reference height of the reference beam on the target surface in a highly precise and easily recognizable manner—in particular without contacting or scribing the surface.

Referring to the structural features, the inventive laser receiver comprises a laser light photo sensor having a plurality of photo sensitive elements. The photo sensitive elements provide an electrical output when illuminated by said external reference laser beam, which is emitted e.g. by an external rotating laser device. The photo sensitive elements may be arranged in a substantially vertically oriented linear array row. Exemplarily, the laser light photo sensor may comprise a photodiode array, a CCD- or CMOS-sensor array or a PSD-sensor.

A circuitry is connected to the laser light photo sensor and designed for determination of the relative position of a defined zero-point of the laser receiver with respect to the reference laser beam. Appropriate circuitries are well known to a person skilled in the art and may comprise electric receiving circuits, analog-digital converter and a digital evaluation circuit. Alternatively, the determination of an impinging position of the detected reference beam may also be performed by an only-electrical circuitry. Regarded from functional aspects, said circuitry can be designed so as to determine—based on the electrical outputs of the photo sensitive elements—a vertical offset between the zero point and a detected vertical center of the reference laser beam.

Furthermore, there exists a visible readout for indicating said relative position, wherein the relative position may be a vertical offset between the laser receiver and the external reference beam. In particular, said visible readout is designed for indicating if said zero point is on-grade with respect to a vertical center of said reference laser beam. The visible readout may be designed as digital display—for example an OLED- or LED-display—and/or comprise e.g. three differently colored indicating lights for easily showing if the receiver is held too high, too low or on-grade with respect to the detected reference beam.

According to the invention, the laser receiver further comprises at least a first laser fan emitter with a laser light source and at least one fan-generating optical element, wherein the laser fan emitter being designed for projecting a visible laser line onto a target surface. In particular, the laser fan is emitted in order to re-project a sharp marking-line through the vertical center of the received reference laser beam.

In other words, the first laser fan emitter is built and arranged for emitting a flat—substantially planar—fan-shaped laser beam having at least one wavelength in the visible range. Particularly, the first laser fan emitter is arranged in such a way that—in a leveled condition of the laser light receiver—the laser fan is emitted from a position on-grade with respect to said zero point. This allows the vertical center of a leveled reference rotating beam to be made visible in a precise manner also at large distance from the rotator unit. Accordingly, the indicated height reference of the rotating laser beam may easily be transferred onto a working surface. The reference laser plane becomes more independent of the spot size and beam divergence of the rotating laser.

For example, the laser fan emitter comprises a laser diode with a collimation lens and a downstream arranged cylindrical lens for fan-shaping of the beam and, hence, generating a stationary laser fan.

Especially, as known from common laser receivers, a tilt sensor—e.g. a level vial—for horizontal alignment of the laser receiver may be provided on the housing.

Furthermore, the laser receiver may comprise an auto-leveling system for automatic horizontal alignment of the optical axis of the first laser fan emitter, in spite of a tilted condition of the laser receiver.

Auto-leveling solutions per se are known to persons skilled in the art and may include using a tilt sensor and mechanical system to drive the laser optics into a level position or using an optical system that employs fluids to project one or more level laser fans.

The auto-leveling system may exemplarily be designed as a suspended pendulum being pivotable—especially with two degrees of freedom—around a center of suspension, wherein the laser light source and the fan-generating optical element of the laser fan emitter being attached to the pendulum. In order to allow emission of the laser fan on-grade with respect to the external reference beam, the center of suspension can be arranged on-grade with respect to the zero point of the laser receiver. Therefore, in an on-grade-position of the receiver with respect to the reference beam, the laser fan is emitted so as to make the reference height of the external reference beam visible as a marking line on a working surface.

In order to allow setting—and/or in particular re-setting—of the emitting-position so as to be on equal height with the defined zero point, the first laser fan emitter may be adjustable in its vertical position. For example, the center of suspension of the pendulum mount may be vertically adjustable relative to a housing of the laser receiver.

In a special embodiment, the auto-leveling system is designed so as to be lockable, wherein the automatic alignment function is temporarily disabled. Such a feature allows an operator to manually pitch or roll the laser receiver to a desired angle in order to project angled laser lines onto a working surface.

Additionally, an inclination sensor—in particular a two-axis inclination sensor—may be provided in the laser receiver for precisely inclining (pitching or rolling) the laser receiver precisely to a desired angle. For example, the sensor may be designed as optoelectronic inclinometer for measuring an inclination angle of the laser receiver with respect to the gravitational vector.

Therefore, the laser fan can be emitted with a defined desired propagation direction in order to project a precisely angled laser line onto the target surface through the reference height which is indicated by the rotating reference beam. For example, such a projection of exactly angled lines through a reference height can be used for applications such as installing stairs.

In a further special embodiment, the laser receiver is provided with a second laser fan emitter for projecting a visible laser line onto a target surface, in particular wherein said first and said second laser fan emitter having different—particularly opposed—azimuthal orientations. Furthermore, a plumb down laser beam emitter may exist for projecting a visible laser mark onto a ground surface so as to allow for horizontal alignment of the laser receiver. Thereby, an auto-leveling system may also be designed for automatic horizontal alignment of the optical axis of the second laser fan emitter and for automatic vertical alignment of the optical axis of the plumb down laser beam emitter.

Preferably, the laser receiver comprises a housing, wherein at least the housing, the laser light photo sensor, the circuitry, the visible readout and the first laser fan emitter—and if provided also the second laser fan emitter and plumb down laser beam emitter—are assembled as a unitary hand-held apparatus. In particular, the laser receiver comprises a fitting for releasable mounting on a tripod, a pole and/or a handle.

The invention further relates to a method for visibly marking locations with respect to a reference laser beam—in particular a reference laser beam of a rotating construction laser.

The method includes the steps of detecting the reference laser beam, determining an incidence position of said reference laser beam, in particular a reference height defined by said reference laser beam, and emitting an—e.g. stationary—laser fan for projecting a visible laser line onto a target surface. Thereby, an emitting-position of the laser fan being adjusted dependent on said determined incidence position, in particular wherein the emitting-position is adjusted so as to be on-grade with respect to said determined incidence position.

In a special embodiment of the method, the propagation direction of the laser fan has a defined inclination angle, in particular wherein the laser fan is auto-leveled for projecting a horizontal laser line onto the target surface. Thereby, the inclination angle of the laser fan propagation direction may be measured using an optoelectronic inclinometer.

Summarized, the inventive idea allows the center of a leveled rotating beam to be visible also at far distances from the rotator unit. The visible laser plane becomes more independent of the spot size and beam divergence of the rotating laser. A rotating laser spot only creates the illusion of a line and, thus, in bright light conditions the laser plane is difficult to see. Re-projecting an—in particular stationary—line laser over that plane allows a rotator to also be used in bright light conditions.

Furthermore, the invention allows a reference height of a rotating laser to be projected also onto surfaces being shaded from the rotating laser beam. Exemplarily, the laser plane generated by a rotating laser installed in a first room may also be used visually in an adjoining room which is only connected by a passageway to the first room. Therefore, a laser receiver according to the invention may be installed on a tripod in the adjoining room. The laser receiver, hence, can be used for projecting a laser line onto a shaded surface in order to indicate the reference height of the rotating beam.

BRIEF SUMMARY OF THE FIGURES

The invention will be explained in greater detail below with reference to examples of possible embodiments shown schematically in the drawings, in which.

DETAILED DESCRIPTION OF SEVERAL EMBODIMENTS

Figure 1:
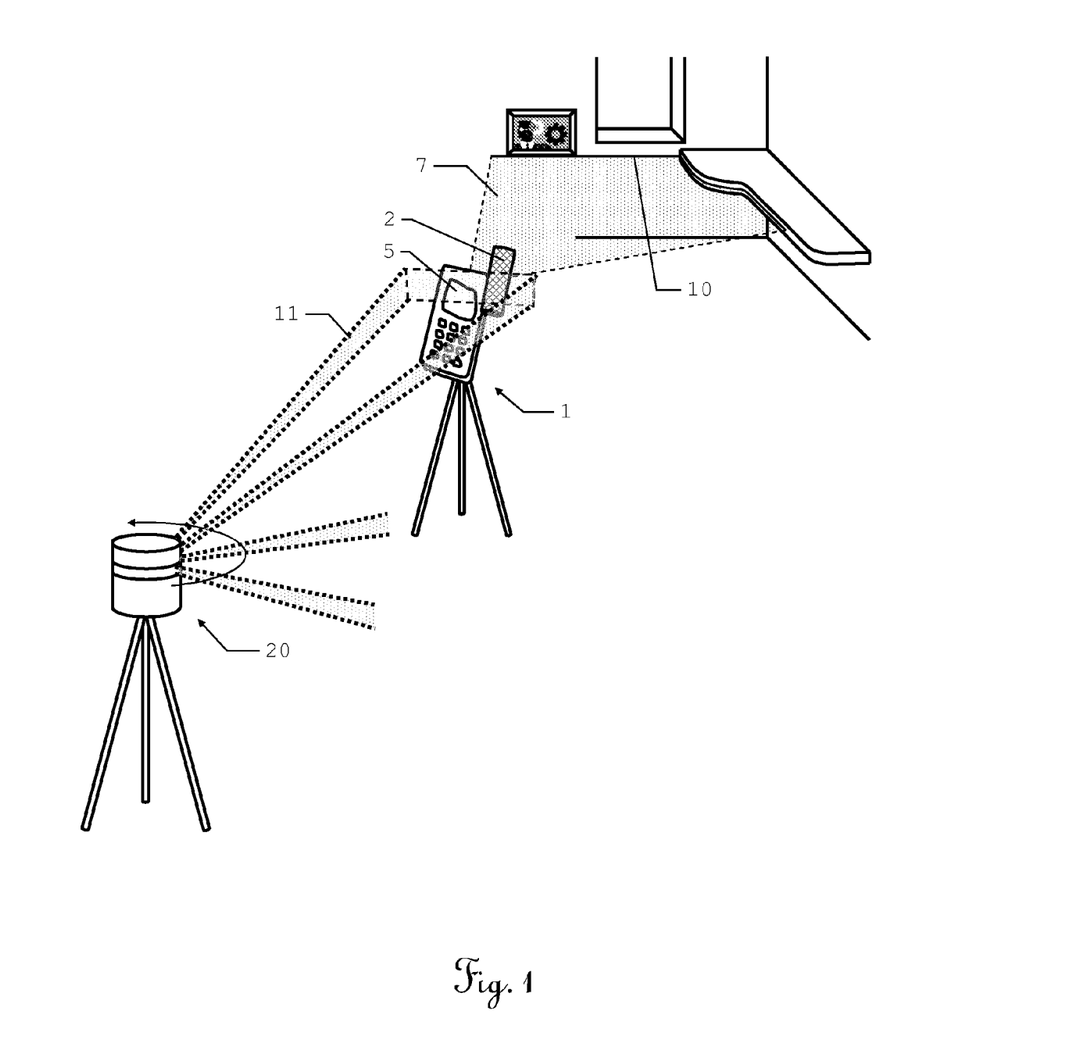
FIG. 1 shows a rotating laser and an embodiment of the inventive laser receiver, wherein the laser receiver projects a leveled sharp laser line—on-grade with respect to the rotating beam—onto a wall.

FIG. 1 shows a rotating laser device 20 and an embodiment of the inventive laser receiver 1, wherein the laser receiver 1 projects a leveled sharp laser line 10—on-grade with respect to the rotating beam 11—onto a wall.

Therefore, the inventive laser receiver 1 comprises a laser light photo sensor 2 having a plurality of photo sensitive elements providing an electrical output when illuminated by the reference laser beam 11, a circuitry connected to said photo sensor for determination of said relative position and a visible readout for indication if the laser receiver 1 is held on-grade with respect to the reference laser beam 11.

Furthermore, according to the invention, a laser fan emitter for projecting a visible laser line 10 onto a target surface is integrated into the laser receiver 1, wherein the laser fan emitter comprises a laser light source and at least one fan-generating optical element.

In order to use the height reference of the rotating laser plane, the laser receiver 1 is mounted on a tripod. Alternatively, the laser receiver 1 may also be mounted on a pole or a handle. Therefore, many different pole/handle/tripod designs are known and available to make this job easier. Most provide an easy height adjustment and, furthermore, a height scale that can be read by the worker. The laser receiver 1 is positioned in the plane of the rotating laser beam 11 such that it indicates an on-grade position. For example, the laser receiver 1 indicates an on-grade-position when it is placed in the center of the rotation plane with an accuracy of about 0.75 mm. In this position, the reference height can be made visible in a precise way as sharp horizontal line 10 on the wall surface by the integrated laser fan emitter.

In the shown embodiment, the laser fan emitter is exemplarily arranged on a back-side of the laser receiver 1, whereas the laser light photo sensor 2 and the display—forming the visible readout 5—are arranged on a front-side. Alternatively or additively, the laser fan 7 may also be emitted from other sides of the housing of the inventive laser receiver 1.

The laser fan 7 may for example be emitted with an opening angle between about 20° and about 135°—according to specific requirements to and a desired application of the laser receiver 1. Respective optical elements for generating the flat laser fan 7 are known to skilled persons. As mentioned above, exemplarily a cylindrical lens may be used as fan-generating respectively fan-shaping element. However, the laser fan 7 may also be generated by a scanning laser beam which appears as a sharp visible marking-line 10 on a target surface.

Figure 2:
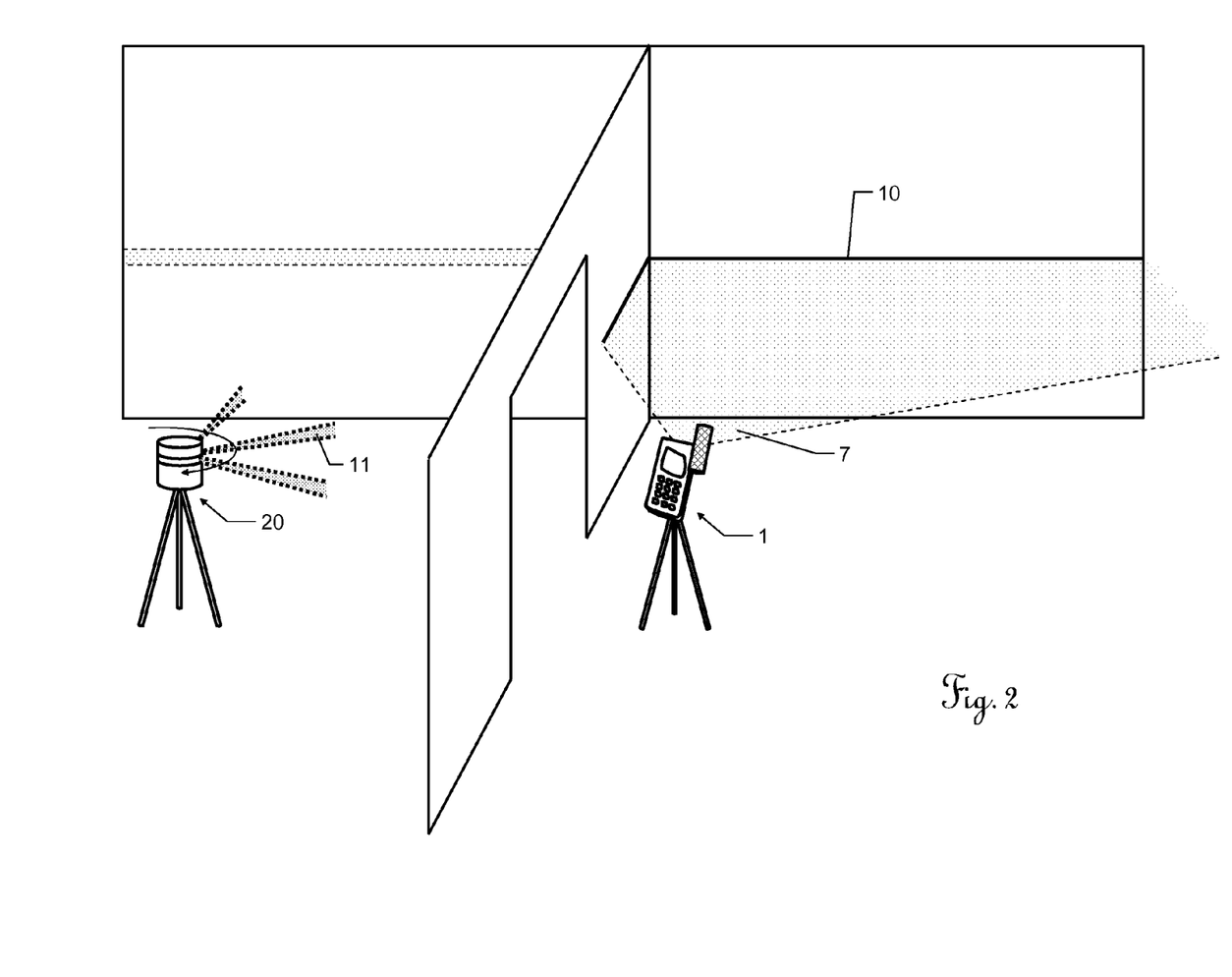
FIG. 2 shows the use of the inventive laser receiver in a room adjacent to the room of the rotating laser.

FIG. 2 shows the use of the inventive laser receiver 1 in a room adjacent to the room where the rotating laser unit 20 is installed.

The direct line of sight from the rotating laser unit 20 to the desired working surface—which is a wall located in an adjacent room—is obstructed by the partition wall. Therefore, neither a visibly usable line is projected onto the target surface by the rotating laser 20 nor may the generated laser plane be found by a laser receiver being held in a condition put against the desired working surface.

Therefore, traditionally, it would have been necessary to physically move the rotating laser unit 20 to the adjacent room. This procedure would have required a new set up and initialization of the rotating unit 20 so as to generate a laser plane in the desired reference height.

Contrarily, according to the invention, the inventive laser receiver 1 can be installed or held in a line of sight—e.g. provided by an open door—on-grade with respect to the rotating reference beam 11. As explained above, the inventive laser receiver 1 itself is built for emitting a laser plane in form of a laser fan 7 and, thus, able to project—on-grade with respect to the reference laser beam 11—a visible sharp laser line 10 onto the obstructed desired working surface.

The laser line 10 projected by the receiver 1, hence, can be used for easily installing light switches or pictures exactly on the reference height or for easily placing boreholes exactly on the height referenced by the rotating laser unit 20.

Although the desired reference height is marked on a wall being located in an adjacent room, a physical movement as well as a laborious and time-intensive new set-up and initialization of the rotating unit 20 are not necessary according to the invention. Contrarily, by using the inventive laser receiver 1, the reference plane generated by the rotating unit 20 and the indicated reference height may nevertheless be used visually in a precise manner without movement of the whole rotating unit 20.

Figure 3:
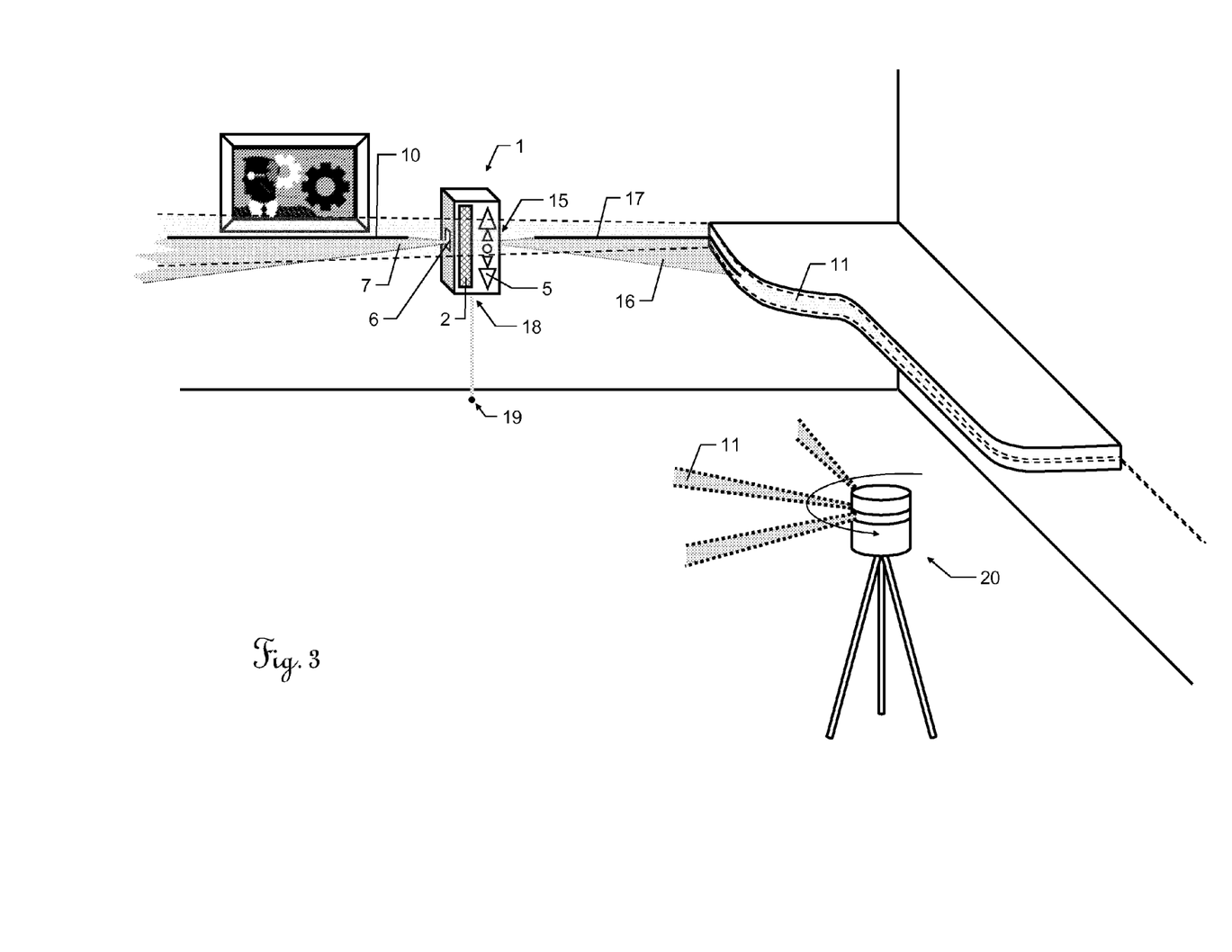
FIG. 3 shows an embodiment of the inventive laser receiver having two laser fan emitters and a wall-mount for directly mounting the laser receiver onto a wall.

FIG. 3 shows an embodiment of the inventive laser receiver 1 having two laser fan emitters 6,15 and a wall-mount for directly mounting the laser receiver 1 onto a wall.

Each of the two laser fan emitters 6,15 generates a flat laser fan 7,16 and is, therefore, built for projecting a visible laser line 10,17 onto the target surface. In particular, said first and said second laser fan emitters 6,15 have opposed optical propagation orientations so that—in a wall-mounted-condition of the laser receiver 1—a laser line 10,17 is projected on the left and on the right of the laser receiver 1.

The laser light photo sensor 2 and the visible readout 5 are arranged on a front side of the laser receiver 1, whereas the wall-mount is arranged on a back side.

The wall-mount is designed in such a way, that the laser receiver 1 may easily directly be mounted onto a wall. In a simple embodiment, the wall-mount may e.g. be represented by one or more suction cups. Particularly, the wall-mount is built as a rotary wall-mount for allowing the laser receiver 1 to pivot about an axis being perpendicular with respect to the wall.

This allows the center of a leveled rotating beam 11 to be visible also at long distances from the rotator unit 20. The visible laser lines 10,17—projected by the two laser fan emitters 6,15 of the laser receiver 1—are independent of the spot size and beam divergence of the rotating laser beam 11. A rotating laser beam only creates the illusion of a line and, thus, in bright light conditions, the laser plane is difficult to see. Re-projecting an—in particular stationary—laser line over that plane allows a laser rotator 20 to also be used in bright light conditions and over long distances.

Furthermore, a plumb down laser beam emitter 18 is arranged on the bottom side of the laser receiver 1 in order to project a visible laser mark 19 onto a ground surface. The plumb down beam may be projected in order to aid in horizontally orientating of the laser receiver.

Figure 4:
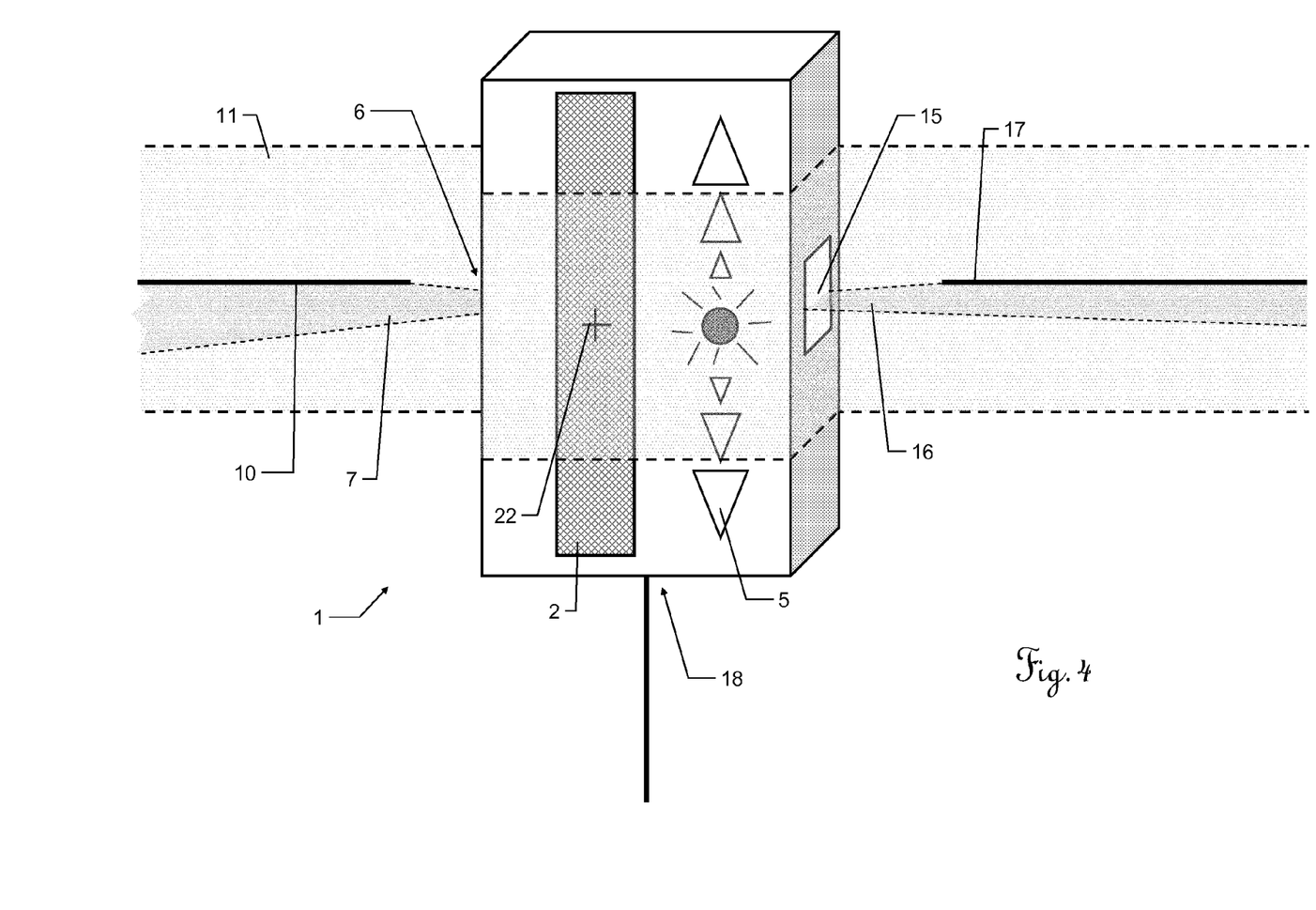
FIG. 4 shows a detailed view of the inventive laser receiver held in the center of a reference laser beam.
Figure 5:
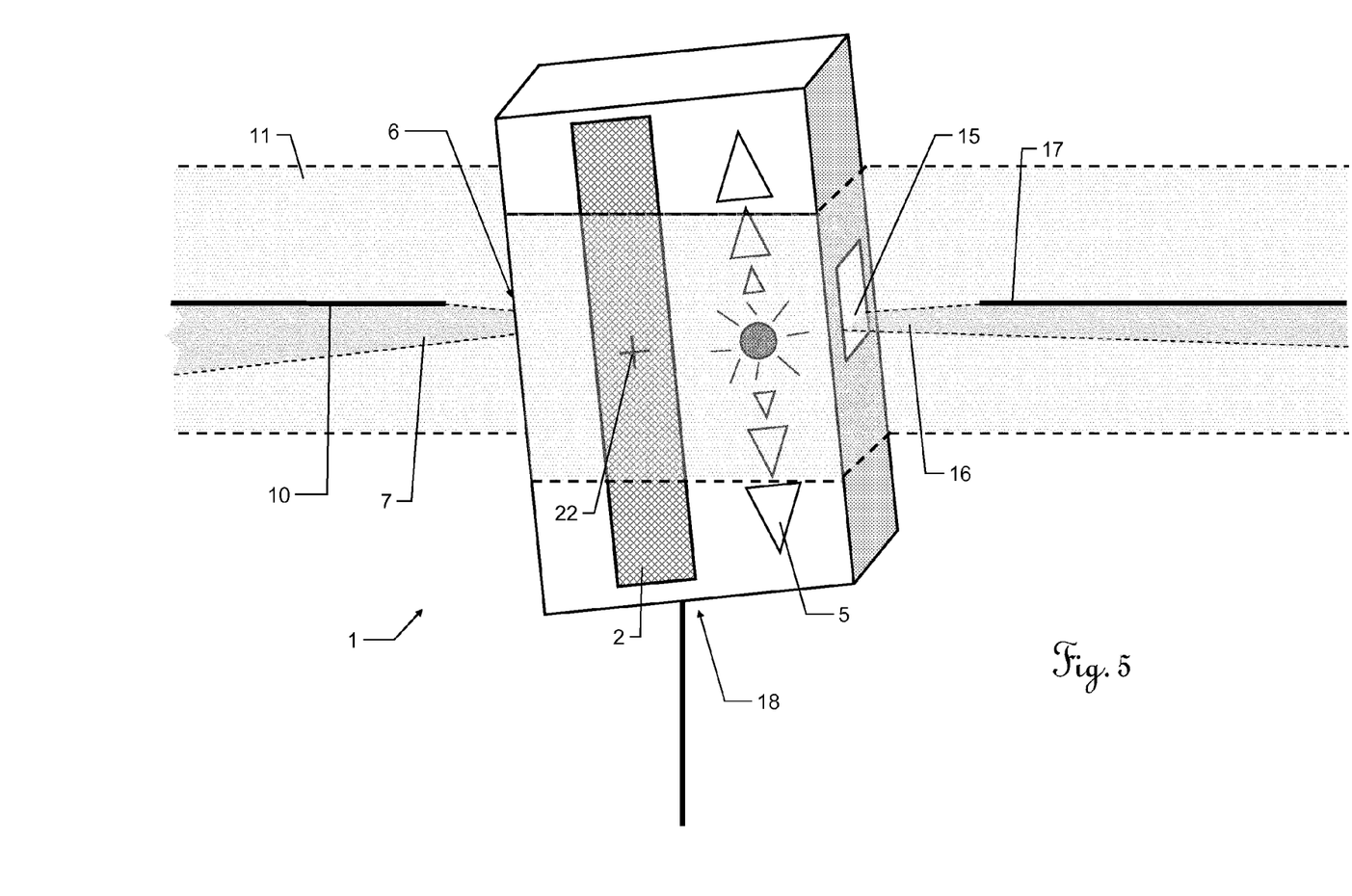
FIG. 5 shows a detailed view of the inventive laser receiver having an auto leveling system, the laser receiver being in a slightly tilted condition.
Figure 6:
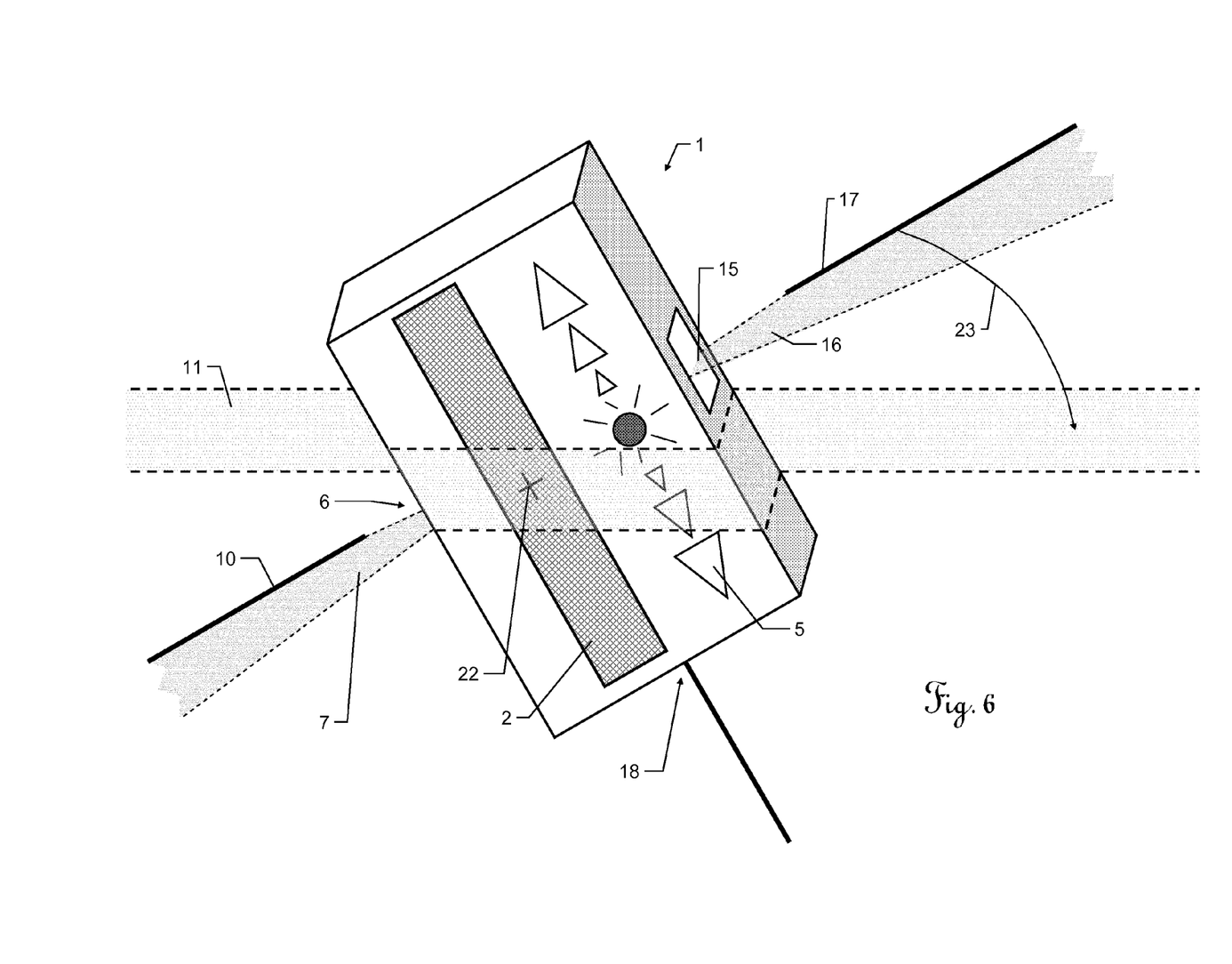
FIG. 6 shows a detailed view of the inventive laser receiver wherein the auto leveling system is locked, so that the laser lines can be projected at a desired angle.

FIGS. 4, 5 and 6 show a detailed view of the inventive laser receiver 1 being held in the center of a reference laser beam 11 e.g. of a rotating laser unit. In FIG. 4, the laser receiver 1 is shown in a horizontal condition and the optical axes of the two laser fan emitters 6,15 are oriented horizontally. FIG. 5 shows a slightly tilted condition of the laser receiver 1. However, because of the auto leveling system of the laser receiver 1, the optical axes of the two laser fan emitters 6,15 are automatically oriented horizontally in order to precisely mark the reference height of the rotating laser. Therefore, in case that the laser receiver 1 has been positioned correctly at the reference height indicated by the rotating beam 11, the auto-leveled emitted laser fans 7,16 project horizontal laser lines 10,17 onto a surface directly behind and/or to the sides of the receiver 1 (i.e. onto a wall). The laser lines 10,17 clearly show the center of the rotating plane to the user. In FIG. 6, the laser receiver 1 is tilted to a desired inclination angle 23 and the auto leveling system is locked so that the automatic horizontal alignment is temporarily disabled. Therefore, laser lines 10,17 having a defined angle 23 can be projected by the two laser fan emitter 6,15 through the reference height indicated by the rotating laser beam 11. In order to help a user rotating the laser receiver 1 to a defined desired angle 23, the laser receiver 1 may further comprise an inclinometer for measuring the inclination angle of the laser receiver 1 with respect to the gravitational vector, wherein the measured angle may be displayed to a user. As known to persons skilled in the art, the inclinometer may exemplarily comprise optoelectronic means, electro-mechanical means (e.g. accelerometer) or purely mechanical means (e.g. graduated pendulum).

In particular, the laser receiver shown in FIGS. 4, 5 and 6 comprises a laser light photo sensor 2 in order to detect the reference laser plane generated by a rotating beam 11. The receiver 1 can be moved by a user to the center of the reference plane. To do so, indicators 5 prompt the user to move the receiver up or down depending on the position of a defined zero point 22 of said laser receiver 1 with respect to the reference beam center. Therein, the reference beam center is determined by an evaluation circuitry connected to the laser light photo sensor 2. The user can then mount the system e.g. to a surface or a tripod at the reference laser plane center height—which means on-grade with respect to the vertical center of the reference laser plane.

Furthermore, a plumb down laser beam emitter 18 is arranged on the bottom side of the laser receiver 1 in order to project a visible laser mark onto a ground surface. The plumb down beam may be projected in order to aid in horizontally orientating of the laser receiver 1. However, in spite of a slightly tilted condition of the laser receiver 1, the auto-leveling system is designed for automatic horizontal alignment of the optical axis of the first and second laser fan emitter 6,15 as well as for automatic vertical alignment of the plumb down laser beam. The auto-leveling system may comprise—as shown in more detail in FIG. 8—a suspended pendulum being pivotable with two degrees of freedom around a center of suspension.

Figure 7:
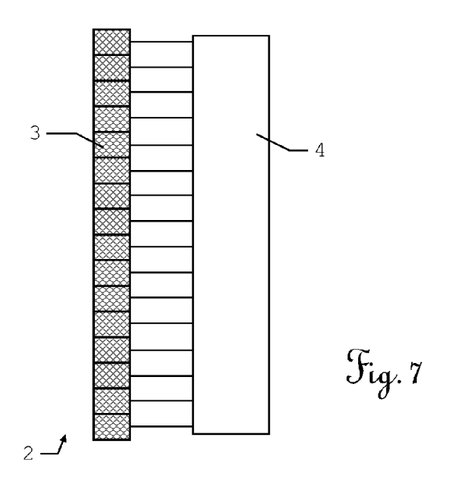
FIG. 7 shows an exemplary embodiment of a laser light photo sensor connected with a circuitry for determination of a position of the inventive laser receiver with respect to an impinging reference beam.

FIG. 7 shows an exemplary embodiment of a laser light photo sensor 2 connected with a circuitry 4 for determination of a position of the defined zero point of the laser receiver with respect to an impinging reference beam.

The laser light photo sensor 2 has a plurality of photo sensitive elements 3 providing an electrical output when illuminated by a reference laser beam. The circuitry 4 is connected to the photo sensor 2 and designed for determining the relative position of a defined zero point of the laser receiver with respect to the reference laser beam. In particular, the circuitry 4 determines—based on the electrical outputs of the photo sensitive elements 3—a vertical offset between the defined zero point and a detected vertical center of the reference laser beam.

As exemplarily shown in FIG. 7, the photo sensitive elements 3 may be arranged in a linear array row.

Respective laser light photo sensors and circuitries are well known to skilled persons and may be adopted according to the desired requirements and a desired application of the laser receiver.

Figure 8:
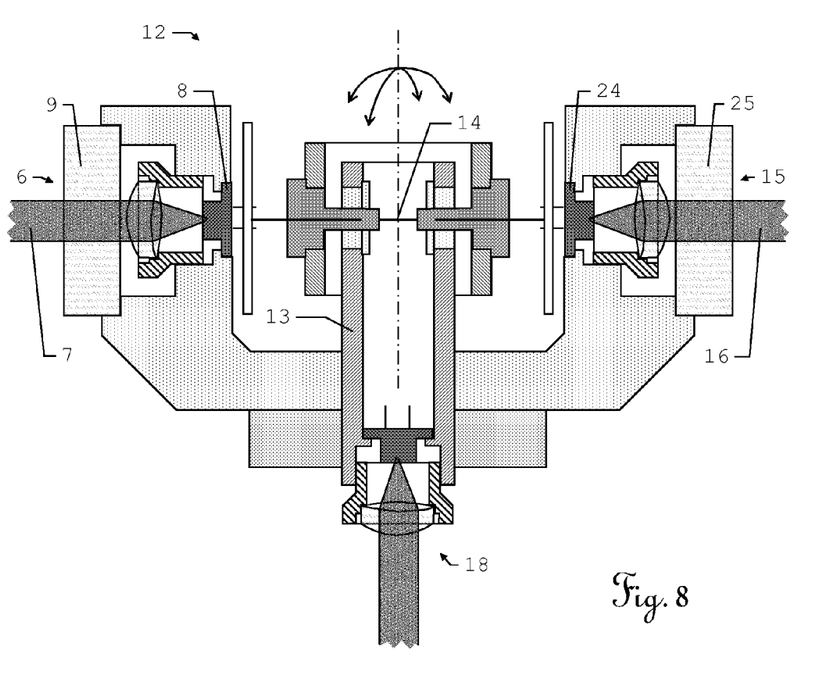
FIG. 8 shows an exemplary embodiment of an auto-leveling system for automatic horizontal alignment of the optical axis of the laser fan emitter.

FIG. 8 shows an exemplary embodiment of an auto-leveling system 12 for automatic horizontal alignment of the optical axis of the laser fan emitters 6,15.

The shown auto-leveling system 12 comprises a suspended pendulum 13 being pivotable—in particular with two degrees of freedom—around a center of suspension 14. Thereby, the center of suspension 14 may be arranged on-grade with respect to the zero point of the laser receiver.

The laser light sources 8,24 as well as the fan-shaping optical elements 9,25 of the first and second laser fan emitters 6,15 are attached to the pendulum 13.

Also the plumb down laser beam emitter 18 is arranged onto the pendulum 13.

Gravity pulls the pendulum 13 downward allowing laser optics, mounted to the pendulum 13, to produce automatically horizontally respectively vertically aligned beams 7,16 regardless of a slight tilt of the laser receiver.

In particular, a gimbal mounting together with pivot screws allow the pendulum 13 be pivotable with two degrees of freedom. A laser fan emitter mount, which carries one laser light source 8 on a left and one laser light source 24 on a right side of the pendulum 13, is attached to the pendulum 13. Downstream of each of the laser light sources 8,24, there is arranged a collimation lens and, thereafter, a cylindrical lens—as fan-generating optical element 9,25—for fanning of each of the laser beams.

Furthermore, a third laser light source, as part of the plumb down laser beam emitter 18, is attached to the pendulum 13 having a downwards orientation. A collimation lens is arranged in the optical path after the third laser light source in order to project—in a vertical direction—a substantially sharp spot or point-mark onto the ground surface. Therefore, the plumb down beam may provide for a horizontal reference. Additively, a cylindrical lens may be added also to the plumb down laser in order to generate a vertical laser fan instead of projecting a single point.

According to specific requirements or demands of the laser receiver, slight variations of the shown embodiment or other embodiments of pendulum-like assemblies for generating an auto-leveled laser beam are known to a person skilled in the art and shown for example in U.S. Pat. No. 5,459,932 or U.S. Pat. No. 5,108,177.

Furthermore, the auto-leveling system may alternatively be designed as inclination sensor together with a mechanical system—particularly having a piezo-electrical drive—for regulating the position and orientation of the at least one fan-generating optical element of the laser fan emitter in such a way, that the optical axis of the laser fan emitter is horizontally aligned.

According to another possible embodiment, the auto-leveling system may be designed as optical system comprising fluids as further optics of the laser fan emitter, the optical system being built in such a way, that the optical axis of the first laser fan emitter is horizontally aligned.

Although the invention has been illustrated above, partly with reference to some preferred embodiments, it must be understood that numerous modifications and combinations of different features of the embodiments can be made. All of these modifications lie within the scope of the appended claims.

What is claimed is:

1. A laser receiver for detecting a relative position of a defined zero point of said laser receiver with respect to an external reference laser beam not from the laser receiver, the laser receiver comprising:
   a laser light photo sensor having a plurality of photo sensitive elements providing an electrical output when illuminated by said external reference laser beam;
   circuitry connected to said photo sensor for determination of said relative position;
   a visible readout for indication of said relative position, wherein the visible readout includes a first laser fan emitter including a laser light source; and
   at least one fan-generating optical element for projecting a visible laser line onto a target surface, wherein the visible laser line is from a substantially flat planar fan-shaped laser beam emitted from the first laser fan emitter; and a housing, wherein at least said housing, said laser light photo sensor, said circuitry, said visible readout and said first laser fan emitter are assembled as unitary apparatus.

2. A laser receiver according to claim 1, wherein the first laser fan emitter is arranged in such a way that the planar fan-shaped laser beam is emitted from a position on-grade with respect to said zero point.

3. A laser receiver according to claim 1, wherein the first laser fan emitter is arranged in a levelled condition of the laser receiver the planar fan-shaped laser beam is emitted from a position on-grade with respect to said zero point.

4. A laser receiver according to claim 1, further comprising an auto-leveling system for automatic horizontal alignment of the optical axis of the first laser fan emitter, in spite of a tilted condition of the laser receiver.

5. A laser receiver according to claim 4, wherein the auto-leveling system comprises a suspended pendulum being pivotable around a center of suspension, wherein the laser light source and the at least one fan-generating optical element being attached to the pendulum and wherein the center of suspension being arranged on-grade with respect to the zero point.

6. A laser receiver according to claim 4, wherein the auto-leveling system comprises a suspended pendulum being pivotable with two degrees of freedom around a center of suspension, wherein the laser light source and the at least one fan-generating optical element being attached to the pendulum and wherein the center of suspension being arranged on-grade with respect to the zero point.

7. A laser receiver according to claim 4, wherein the auto-leveling system is designed as one of the following systems:
an inclination sensor and a mechanical system having a piezo-electrical drive for regulating the position and orientation of the first laser fan emitter and/or its optics in such a way that the optical axis of the first laser fan emitter is horizontally aligned; or
an optical system comprising fluids as further optics of the first laser fan emitter, the optical system being built in such a way that the optical axis of the first laser fan emitter is horizontally aligned.

8. A laser receiver according to claim 4, wherein the auto-leveling system comprises a locking function for temporarily disabling the automatic alignment.

9. A laser receiver according to claim 1, wherein an emitting-position of the first laser fan emitter is vertically adjustable for setting said emitting-position on-grade with respect to said zero point.

10. A laser receiver according to claim 1, wherein an emitting-position of the first laser fan emitter is vertically adjustable for setting and re-setting said emitting-position on-grade with respect to said zero point.

11. A laser receiver according to claim 1, further comprising a second laser fan emitter for projecting a visible laser line onto a target surface.

12. A laser receiver according to claim 1, further comprising a second laser fan emitter for projecting a visible laser line onto a target surface, wherein said first and said second laser fan emitter having opposed optical propagation orientations and a plumb down laser beam emitter for projecting a visible laser mark onto a ground surface.

13. A laser receiver according to claim 12, wherein the auto-leveling system is also designed for automatic horizontal alignment of the optical axis of the second laser fan emitter and for automatic vertical alignment of the optical axis of the plumb down laser beam emitter.

14. A laser receiver according to claim 1, further comprising a tilt sensor.

15. A laser receiver according to claim 1, further comprising a level vial, for horizontal alignment of said laser receiver.

16. A laser receiver according to claim 1, further comprising an inclinometer.

17. A laser receiver according to claim 1, further comprising an optoelectronic or electromechanical inclinometer for measuring an inclination angle of the laser receiver with respect to the gravitational vector.

18. A laser receiver according to claim 1, wherein:
the photo sensitive elements are arranged in a linear array row;
the circuitry determines, based on the electrical outputs of the photo sensitive elements, a vertical offset between the zero point and a detected vertical center of the external reference laser beam; and
the visible readout is designed for indicating if said zero point is on-grade with respect to said vertical center of the external reference laser beam.

19. A laser receiver according to claim 1, wherein the external reference laser beam is a reference laser beam of a rotating construction laser.

20. A laser receiver according to claim 1, wherein the visible readout for indication of said relative position indicates if the zero point is in an on-grade position with respect to said external reference laser beam.

21. A laser receiver according to claim 1, wherein the at least one fan-generating optical element projects a visible laser line onto a target surface, particularly in order to re-project a sharp marking-line through the vertical center of the external reference laser beam.

22. A laser receiver according to claim 1, further comprising a housing, wherein at least said housing, said laser light photo sensor, said circuitry, said visible readout and said first laser fan emitter are assembled as unitary hand-held apparatus, having:
a fitting for releasably mounting on a tripod, a pole and/or a handle; and/or
a wall-mount for directly mounting the laser receiver onto a wall, especially a rotary wall mount for allowing the laser receiver to pivot about an axis being perpendicular with respect to the wall.

23. A method for visibly marking locations with the laser receiver of claim 1 with respect to an external reference laser beam, comprising the steps of:
detecting the external reference laser beam not from the laser receiver;
determining an incidence position of said external reference laser beam; and
emitting a laser fan from a first laser fan emitter of the laser receiver for projecting a visible laser line onto a target surface, wherein the visible laser line is from a substantially flat planar fan-shaped laser beam emitted from the first laser fan emitter,
wherein an emitting position of the laser fan being adjusted dependent on said determined incidence position.

24. A method according to claim 23, wherein the propagation direction of the laser fan has a defined inclination angle, wherein:
the laser fan is auto-levelled for projecting a horizontal laser line onto the target surface; and/or
the inclination angle of the laser fan propagation direction is measured using an optoelectronic inclinometer.

25. A method for visibly marking locations with the laser receiver of claim 1 with respect to an external reference laser beam of a rotating construction laser, comprising the steps of:
- detecting the external reference laser beam not from the laser receiver; and
- determining an incidence position of said external reference laser beam, a reference height defined by said external reference laser beam and emitting a laser fan from a first laser fan emitter of the laser receiver for projecting a visible laser line onto a target surface, wherein an emitting-position of the laser fan being adjusted dependent on said determined incidence position, and the emitting-position is adjusted so as to be on-grade with respect to said determined incidence position, wherein the visible laser line is from a substantially flat planar fan-shaped laser beam emitted from the first laser fan emitter.

* * * * *